UNITED STATES PATENT OFFICE.

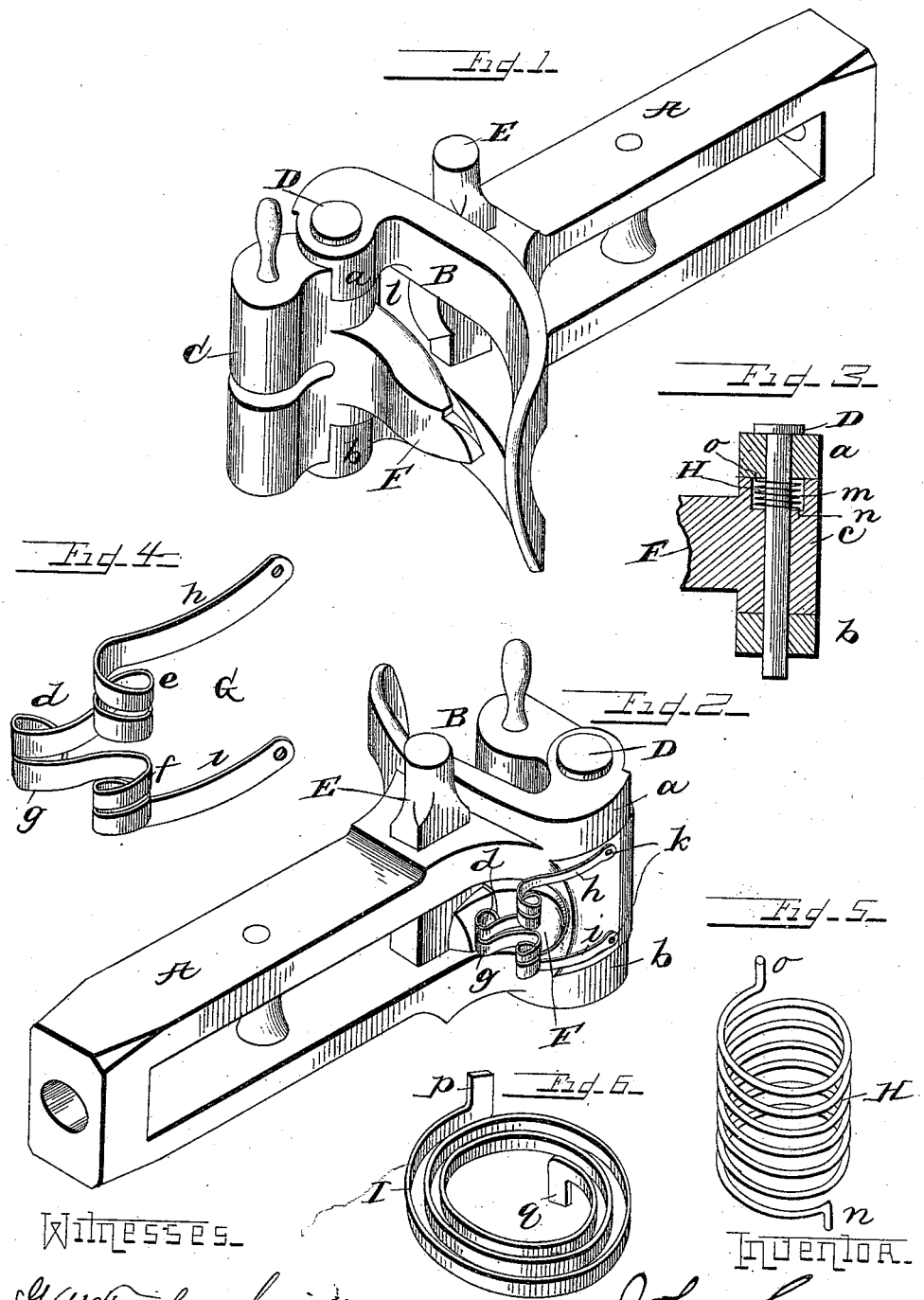

JOHN GREEN, OF RENOVO, PENNSYLVANIA, ASSIGNOR OF ONE-HALF TO WILLIAM L. HOLMAN AND JOHN McCORD, OF SAME PLACE.

CAR-COUPLING.

SPECIFICATION forming part of Letters Patent No. 450,356, dated April 14, 1891.

Application filed January 20, 1891. Serial No. 378,448. (No model.)

*To all whom it may concern:*

Be it known that I, JOHN GREEN, a citizen of the United States, residing at Renovo, in the county of Clinton and State of Pennsylvania, have invented certain new and useful Improvements in Automatic Car-Couplings; and I do hereby declare the following to be a full, clear, and exact description of the invention, such as will enable others skilled in the art to which it appertains to make and use the same.

My invention relates to car-couplings, and has especial reference to that class of couplings known as the "Janney," and has for its object certain improvements in means for throwing the hook into and retaining it in position for automatic coupling.

The invention will be hereinafter described, and particularly pointed out in the claims.

In the accompanying drawings, which form part of this specification, Figure 1 represents a perspective view of my improved coupling, showing the hook in position for coupling; Fig. 2, a similar view taken from the rear side and showing the hook closed; Fig. 3, a section through the lugs on the draw-head and the lug on the coupling-hook; Fig. 4, a perspective, on an enlarged scale, of the main spring; Fig. 5, a similar view of the auxiliary spring, and Fig. 6 a perspective of a modified form of the auxiliary spring.

By placing the spring on the outside of the draw-head it is protected from being crushed by the tongue of the hook in the act of coupling, and can be readily inspected and repaired in the event of its being injured by any cause.

Reference being had to the drawings and the letters thereon, A indicates a draw-bar having a head B, which is provided with lugs *a b*, between which the hook C is secured by a pin D, which passes through the lugs *a b* and the lug *c* on the hook. In the rear of the head and passing vertically through the draw-bar is a pin E, with which the end of the tongue F of the hook C engages when the hook is coupled with an adjacent coupling, and to the rear side of the head B is secured a spring G, the end *d* of which rests upon the rear of the tongue F when the parts are coupled and provides a ready and effectual means for automatically throwing the hook in position for coupling when released from the pin E. The spring G is made of a continuous piece of steel and comprises two helical springs *e f*, one on each side, and a terminal bent or volute spring *g*, which rests upon the tongue F of the hook and is secured to the draw-head by its arms *h i*, through which screw-bolts or rivets *k k* are inserted. The rear side of the draw-head is open at *l*, and the spring *g* protrudes into the head through said opening as the hook is thrown forward by the spring. In the upper surface of the lug *c* on the hook C is a recess *m*, in which is a coiled spring H, one end of which is inserted in an aperture *n* in the lug *c* and the opposite end in an aperture *o* in the lower surface of the lug *a* of the head, and serves to hold or retain the hook C in position for automatic coupling. The pin D passes through the spring H and secures it in position, and the spring is relieved entirely of the weight of the hook by being placed on the upper side of the lug *c*, and is, furthermore, inclosed in the head, so that it cannot be tampered with or be affected by accident.

In Fig. 6 is shown a modified construction of the auxiliary spring, which consists of a volute spring I, made of a flat piece of steel and provided with ends *p q* for securing it in position.

When the tongue of the hook is pressed back into the draw-head in the act of coupling, the volute spring *g* is pushed back and spiral springs *e f* and the arms *h i* put under tension, and when the pin E is raised by any means the spring throws the hook forward, thereby avoiding the necessity of a brakeman or other employé using and endangering his hand to set the hook.

Having thus fully described my invention, what I claim is—

1. In an automatic car-coupler, a swinging hook, in combination with a spring secured to the outer surface of the rear side of the draw-head and bearing upon the tongue of the hook to automatically throw the hook forward.

2. In an automatic car-coupler, a draw-head having an opening in the rear side thereof and a swinging hook, in combination with a spring secured to the outside of the draw-head and protruding through said opening into the head.

3. In an automatic car-coupler, a draw-bar having an aperture in the rear side of the head and a swinging hook, in combination with a double spiral spring secured to the outside of the draw-head and operating upon the hook through said aperture.

4. In an automatic car-coupler, a swinging hook, in combination with a double spiral spring having arms and secured to the draw-head by said arms and operating upon the tongue of the hook.

5. In an automatic car-coupler, a swinging hook, in combination with a triple spring consisting of two spiral and a volute spring constructed and arranged to automatically throw the hook forward into position for coupling.

6. In an automatic car-coupler, a swinging hook, in combination with a main spring for throwing the hook forward and an auxiliary spring for retaining the hook in position for coupling.

7. In an automatic car-coupler, a swinging hook having a recess in its lug and a spring secured to said hook and to the upper lug of the draw-head, in combination with a spring secured to the draw-head and bearing upon the tongue of the locked hook.

8. In an automatic car-coupler, a swinging hook having a recess in the upper side of its lug and a volute spring having oppositely-projecting ends which engage with the lug on the hook and the upper lug on the draw-head.

In testimony whereof I affix my signature in presence of two witnesses.

JOHN GREEN.

Witnesses:
M. DOYLE MARKS,
GEO. B. COLESTOCK.